Oct. 14, 1941.                H. A. KLEINMAN                2,258,770
      MEANS AND METHOD OF CONTINUOUSLY INDICATING THE RATE OF ROTATION
                          OF SELF-VENTILATED MACHINES
                             Filed July 23, 1938
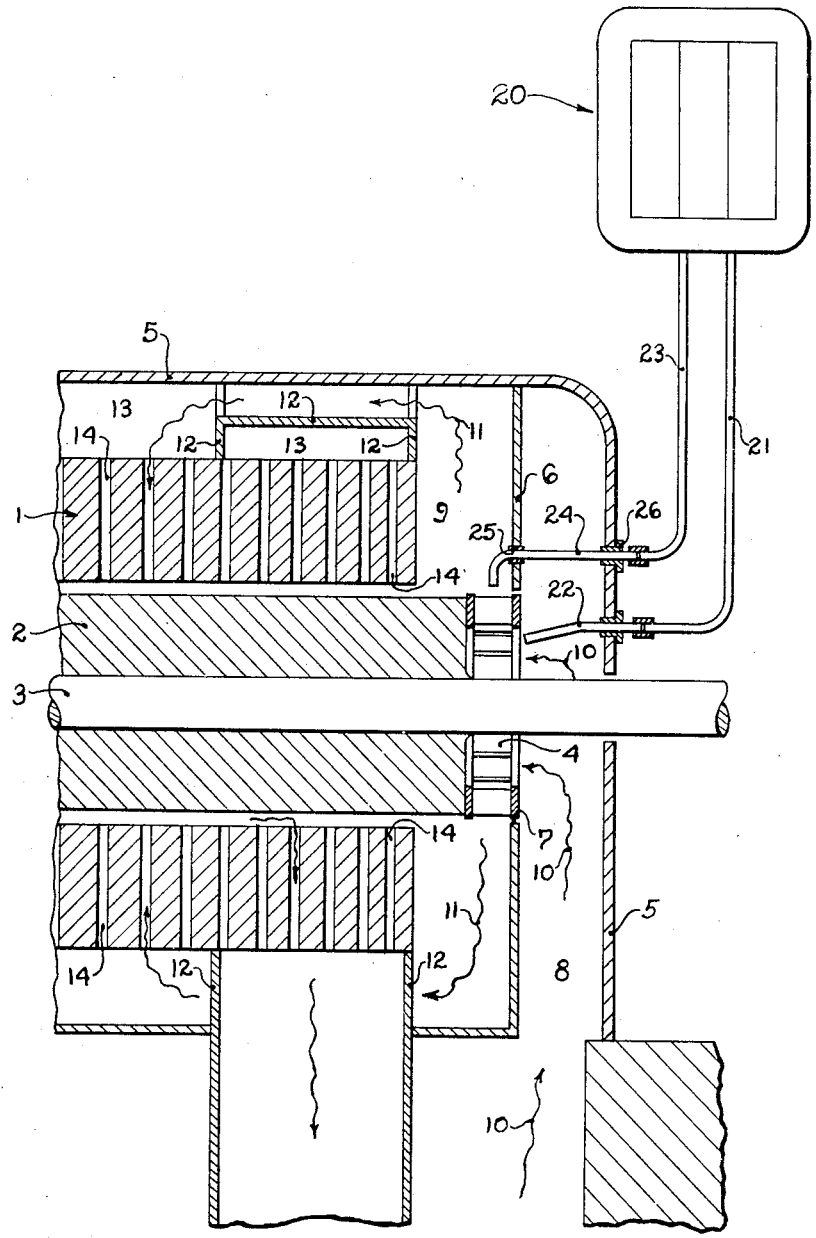
INVENTOR.
HAROLD A. KLEINMAN
BY 
ATTORNEY.

UNITED STATES PATENT OFFICE 2,258,770

MEANS AND METHOD OF CONTINUOUSLY INDICATING THE RATE OF ROTATION OF SELF-VENTILATED MACHINES

Harold A. Kleinman, Moline, Ill., assignor to Westinghouse Electric & Manufacturing Company, East Pittsburgh, Pa., a corporation of Pennsylvania Application July 23, 1938, Serial No. 220,947

5 Claims. (Cl. 171—252)

My invention relates to an improved means for and method of continuously measuring the rate of rotation of the revolving element of any self-ventilated machine enclosed within a housing and having a cooling fan on the revolving element, and has particular application to a self-ventilated turbo-generator unit.

In starting turbo-generator units, particularly the sizes in excess of 10,000 kilowatts capacity, operating at rates of rotation up to 3600 revolutions per minute, it is very desirable to have a continuous indication of the rate of rotation so that the best routine of starting can be established and thereafter closely followed each time the unit is started.

In the case of one particular turbo-generator unit of well known manufacture, for example, the starting instructions call for operation at 600 to 800 revolutions per minute for one hour or longer in order to bring the rotating parts to a uniform operating temperature. The end of this period may be indicated by gages measuring deformation of the rotating parts. When these gages indicate deformations of small magnitude, a uniform temperature of rotating parts is indicated and it is safe to increase the rate of rotation. The speed or rate of rotation is then gradually increased to 1400 revolutions per minute. At this speed, water is supplied the turbine sealing glands, so that the unit may be operated with exhaust pressures below atmospheric pressure without drawing air into the unit where the shaft passes through the casing of the turbine. Thereafter, the speed is gradually increased to 3600 revolutions per minute which is the operating speed. The speed indicator furnished with this unit has a range starting at 2000 revolutions per minute and extending up to 4200 revolutions per minute. This instrument, therefore, is of no assistance in following the starting routine for this unit because it gives no indication of speed until the rate of rotation is in excess of 2000 revolutions per minute. Furthermore, this instrument really measures the frequency of alternations developed in the electrical windings of the generator and, therefore, gives no indication unless the field of the generator is electrically excited. At times, however, it is desirable to have an indication of speed when the generator may be revolving without field excitation.

In general, it is desirable to have a continuous speed indication starting at approximately 15 per cent of operating speed and extending to at least 110 per cent of operating speed. Instruments with which I am acquainted for continuously measuring the rates of rotation of units operating at speeds up to 3600 revolutions per minute and covering such a range require special provisions in the design of the unit and cannot be readily applied to an existing unit not designed with such special provisions. Even when the special provisions are included in the design, geared connections are required subject to constant wear during the operating hours of the unit.

A portable tachometer can be used, but requires constant attendance in order to obtain readings every few minutes and for that reason is impractical.

The object of my invention more specifically is to provide in combination with a self-ventilated turbo-generator unit of a means for continuously measuring the rate of rotation of the rotor thereof which is entirely independent of field excitation, which gives accurate speed indications from 15 per cent or less of full speed and extending up to 110 per cent or more of full speed, which requires no special provisions in the design of the unit and may readily be applied to any existing unit, and which requires no connection to any of the moving parts of the unit.

The ventilating fans on self-ventilated turbo-generator units are commonly located on the ends of the revolving field of the electric-generator portion of the turbo-generator unit. The air or gas delivered by these fans passes through a system of ducts and passages of constant resistance to the flow of the air or gas. I have discovered that, by reason of the above, a definite relationship exists between the difference in pressure between the pressure of the air or gas entering the fan and the pressure of the air or gas leaving the fan, and the rate of rotation of the fan, and my invention resides essentially in making use of this relationship to obtain a continuous indication of the rate of rotation of the revolving element of such turbo-generator unit, and consists in measuring with a suitable differential pressure gage the difference in pressure between the air or gas entering the ventilating fan of the unit and the air or gas leaving the fan and converting the measurements in terms of units of rate of rotation.

A preferred embodiment of my invention is described in the following specification and is illustrated in the accompanying drawing in which is shown, in longitudinal vertical section, a portion of the electric-generator part of a typical self-ventilated, turbo-generator unit, to which my invention has been applied.

Referring to the drawing, the generator comprises a stationary armature 1, and a revolving field 2, mounted on a shaft 3. Shaft 3 is journaled in bearings not shown. On the shaft 3, adjacent one end of the field 2, a ventilating fan 4 of the squirrel cage type is fixed.

The armature 1 and field 2, including fan 4, are enclosed in a housing 5. Within the housing a partition 6 is provided having an opening 7, the margin of which is in close proximity to the periphery of the outer side of fan 4. The interior of the housing is thereby divided into compartments 8 and 9, the intake side of fan 4 being in communication with compartment 8 and the exhaust side, with compartment 9. When the field 2, and with it the fan 4, is revolved, the cooling medium, which may be air or some other gas, is drawn into fan 4 from compartment 8, as indicated by arrows 10, 10, and is exhausted into compartment 9 as indicated by arrows 11, 11. Compartment 9 may be divided into sections by partitions 12 to form a system of ducts 13 so that the cooling medium is forced through the passageways 14 in the armature windings in a desired manner. Compartments 8 and 9 either open to the atmosphere or are connected to an external cooler for continuous recirculation of the cooling medium. In either case, the resistance to the flow of the cooling medium through the fan 4 is fixed at a definite value in any given installation.

To measure the rate of rotation of the field 2 of the above described unit, I provide a differential pressure gage 20, and connect the low pressure side thereof by means of a tube 21 to a pipe 22 extending through housing 5 into compartment 8, and connect the high pressure side by means of a tube 23 to a pipe 24 extending through housing 5 and partition 6 into compartment 9. The inner ends of pipes 22 and 24 are shaped so they may be disposed in close proximity to the fan 4, these being the regions of maximum difference in pressure. Preferably the pipe 24 is mounted for rotation in bushings 25 and 26 in the perforations in partition 6 and housing 5 through which the pipe 24 extends, for adjusting the position of the end of the pipe with respect to the direction of flow from the fan.

The differential pressure developed by the fan at any given speed changes slightly from one season to the other, due to consequent changes in temperature of the cooling medium. The aforesaid adjustment provides for maintaining the measured differential pressure at a given speed constant. When the end of pipe 24 is directed toward the fan 4 as shown, the pressure measured is the sum of the static head plus a portion of the velocity head developed by the fan. When the end of pipe 24 is directed away from the fan, the pressure measured is static head minus a portion of the velocity head.

While it is best for greatest accuracy to connect both the high and low sides of the pressure gage to the two compartments, as described, it is not essential in installations in which the compartment 8 is open to the atmosphere to make an actual connection from the low pressure side of the gage to this compartment. Since the pressure in this compartment in such case is substantially atmospheric at all times, the low pressure side of the gage may be left open to the atmosphere, with only the high pressure side connected to compartment 9.

The scale of the differential pressure gage 20 is graduated in units of rate of rotation, as for example, "revolutions per minute," based on the relationship between the differential pressure developed by fan 4 and the rate of rotation of the fan. I have found that the differential pressure developed by the fan varies substantially as the square of the rate of rotation. As a result, to graduate the scale of the gage it is merely necessary to measure the differential pressure developed at a known rate of rotation, as for example at the rated speed which is known after the unit is in operation and synchronized with other units in service, and solve for "K" in the formula $DP = KS^2$ where:

DP is the differential pressure,
K is a constant for any given installation, and
S is the rate of rotation.

Thereupon, the differential pressures corresponding to the different values of rate of rotation to be applied to the scale can be calculated.

Obviously, certain modifications may be made without departing from the spirit of the invention; and the arrangement itself is independent of any specific apparatus. The invention, therefore, is to be regarded as limited only by the scope of the appended claims.

I claim as my invention:

1. In combination, a dynamo-electric machine having a stator member, a housing at least partially enclosing the stator member, a rotor member, a ventilating fan on the rotor member for causing a gaseous cooling medium to flow through the housing, said housing providing a path of substantially constant resistance for the flow of said cooling medium, and means for measuring the difference in pressure of said gas on the intake and discharge sides of said fan, said means being calibrated to indicate the speed of rotation of the rotor member.

2. In combination, a dynamo-electric machine having a stator member, a housing at least partially enclosing the stator member, a rotor member, a ventilating fan on the rotor member for causing a gaseous cooling medium to flow through the housing, said housing providing a path of substantially constant resistance for the flow of said cooling medium, means for measuring the pressure of the gas drawn into the fan, means for measuring the pressure of the gas discharged from the fan, and means actuated by the difference in said pressures for indicating the speed of rotation of the rotor member.

3. In combination, a dynamo-electric machine having a stator member, a housing at least partially enclosing the stator member, a rotor member, a ventilating fan on the rotor member for causing a gaseous cooling medium to flow through the housing, said housing providing a path of substantially constant resistance for the flow of said cooling medium, a tube extending through said housing to closely adjacent the intake side of said fan, a tube extending through the housing to closely adjacent the discharge side of said fan, and indicating means connected to both said tubes and responsive to the difference in pressure of said cooling medium on opposite sides of the fan, said indicating means being calibrated to indicate the speed of rotation of the rotor member.

4. In combination, a dynamo-electric machine having a stator member, a housing at least partially enclosing the stator member, a rotor member, a ventilating fan on the rotor member for causing a gaseous cooling medium to flow through the housing, said housing providing a path of substantially constant resistance for the flow of said cooling medium, a tube extending through said housing to closely adjacent the intake side of said fan, a tube extending through the housing to closely adjacent the discharge side of said fan, said last-mentioned tube being rotatably mounted in the housing to permit adjustment of its position relative to the fan, and indicating means connected to both said tubes and responsive to the difference in pressure of said cooling medium on opposite sides of the fan, said indicating means being calibrated to indicate the speed of rotation of the rotor member.

5. In combination, a dynamo-electric machine having a stator member, a housing at least partially enclosing the stator member, a rotor member, a ventilating fan on the rotor member for causing a gaseous cooling medium to flow through the housing, said housing providing a path of substantially constant resistance for the flow of said cooling medium, a tube extending through the housing to closely adjacent the discharge side of the fan, said tube being rotatably mounted in the housing to permit adjustment of its position relative to the fan, and indicating means connected to said tube and responsive to changes in pressure of said cooling medium, said indicating means being calibrated to indicate the speed of rotation of the rotor member.

HAROLD A. KLEINMAN.